United States Patent
Van Mierloo et al.

(10) Patent No.: US 11,578,186 B2
(45) Date of Patent: *Feb. 14, 2023

(54) POLYPROPYLENE COMPOSITION FOR USE IN BOPP APPLICATION, A PROCESS FOR PREPARING BOPP FILMS AND SAID BOPP FILM

(71) Applicant: SABIC GLOBAL TECHNOLOGIES B.V., Bergen op Zoom (NL)

(72) Inventors: Sarah Van Mierloo, Geleen (NL); Patrick Voets, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 428 days.

This patent is subject to a terminal disclaimer.

(21) Appl. No.: 16/608,415

(22) PCT Filed: Apr. 26, 2018

(86) PCT No.: PCT/EP2018/060715
§ 371 (c)(1),
(2) Date: Oct. 25, 2019

(87) PCT Pub. No.: WO2018/197610
PCT Pub. Date: Nov. 1, 2018

(65) Prior Publication Data
US 2020/0190283 A1 Jun. 18, 2020

(30) Foreign Application Priority Data
Apr. 28, 2017 (EP) .................................... 17168748

(51) Int. Cl.
| | |
|---|---|
| *C08K 5/1545* | (2006.01) |
| *B29C 48/00* | (2019.01) |
| *B29C 48/08* | (2019.01) |
| *C08J 5/18* | (2006.01) |
| *C08K 5/098* | (2006.01) |
| *B29K 23/00* | (2006.01) |

(52) U.S. Cl.
CPC ........ *C08K 5/1545* (2013.01); *B29C 48/0018* (2019.02); *B29C 48/022* (2019.02); *B29C 48/08* (2019.02); *C08J 5/18* (2013.01); *C08K 5/098* (2013.01); *B29K 2023/12* (2013.01); *B29K 2023/16* (2013.01); *C08J 2323/12* (2013.01); *C08J 2323/14* (2013.01); *C08K 2201/019* (2013.01)

(58) Field of Classification Search
None
See application file for complete search history.

(56) References Cited

U.S. PATENT DOCUMENTS

| | | |
|---|---|---|
| 2010/0081741 A1 | 4/2010 | Keck-Antoine et al. |
| 2016/0311988 A1 | 12/2016 | Potter et al. |
| 2021/0017366 A1 | 1/2021 | Van Mierloo et al. |

FOREIGN PATENT DOCUMENTS

| | | |
|---|---|---|
| CN | 101597401 A | 12/2009 |
| EP | 2028122 A1 | 2/2009 |
| EP | 2433982 A1 | 3/2012 |
| WO | 2015091839 A1 | 6/2015 |
| WO | 2015200586 A1 | 12/2015 |

OTHER PUBLICATIONS

International Search Report; International Application No. PCT/EP2018/060715; International Filing Date: Apr. 26, 2018; dated Jun. 26, 2018; 4 pages.
Written Opinion; International Application No. PCT/EP2018/060715; International Filing Date: Apr. 26, 2018; dated Jun. 26, 2018; 6 pages.
Al-Malaika et al.: "The antioxidant role of α-tocopherol in polymers II. Melt stabilising effect in polypropylene"; Polymer Degradation and Stability; vol. 64; pp. 145-156; 1999.

*Primary Examiner* — Robert T Butcher
(74) *Attorney, Agent, or Firm* — Cantor Colburn LLP

(57) ABSTRACT

The invention relates to a composition comprising: a) a propylene homopolymer or propylene-ethylene copolymer having an ethylene content of at most 1.5 wt % based on the weight of the propylene-ethylene copolymer, said a propylene homopolymer or propylene-ethylene copolymer having: i) a Mw/Mn in the range of 4.0 to 12, wherein Mw stands for the weight average molecular weight and Mn stands for the number average molecular weight and wherein Mw and Mn are measured according to ASTM D6474-12; ii) an XS in the range from 1.0 to 8.0 wt %, wherein XS stands for the amount of xylene solubles which are measured according to ASTM D 492-10; and iii) a melt flow rate in the range of 1 to 10 dg/minas measured according to ISO1133:2011(2.16 kg/230° C.); b) a first additive, being one or more tocopherols and/or one or more tocotrienols; and c) a second additive, being an organic acid scavenger. The invention moreover relates to a biaxially oriented polypropylene (BOPP) film comprising said composition, to a process for the preparation of a biaxially oriented polypropylene (BOPP) film and to the use of the composition for the preparation of an article, preferably a BOPP film.

20 Claims, 1 Drawing Sheet

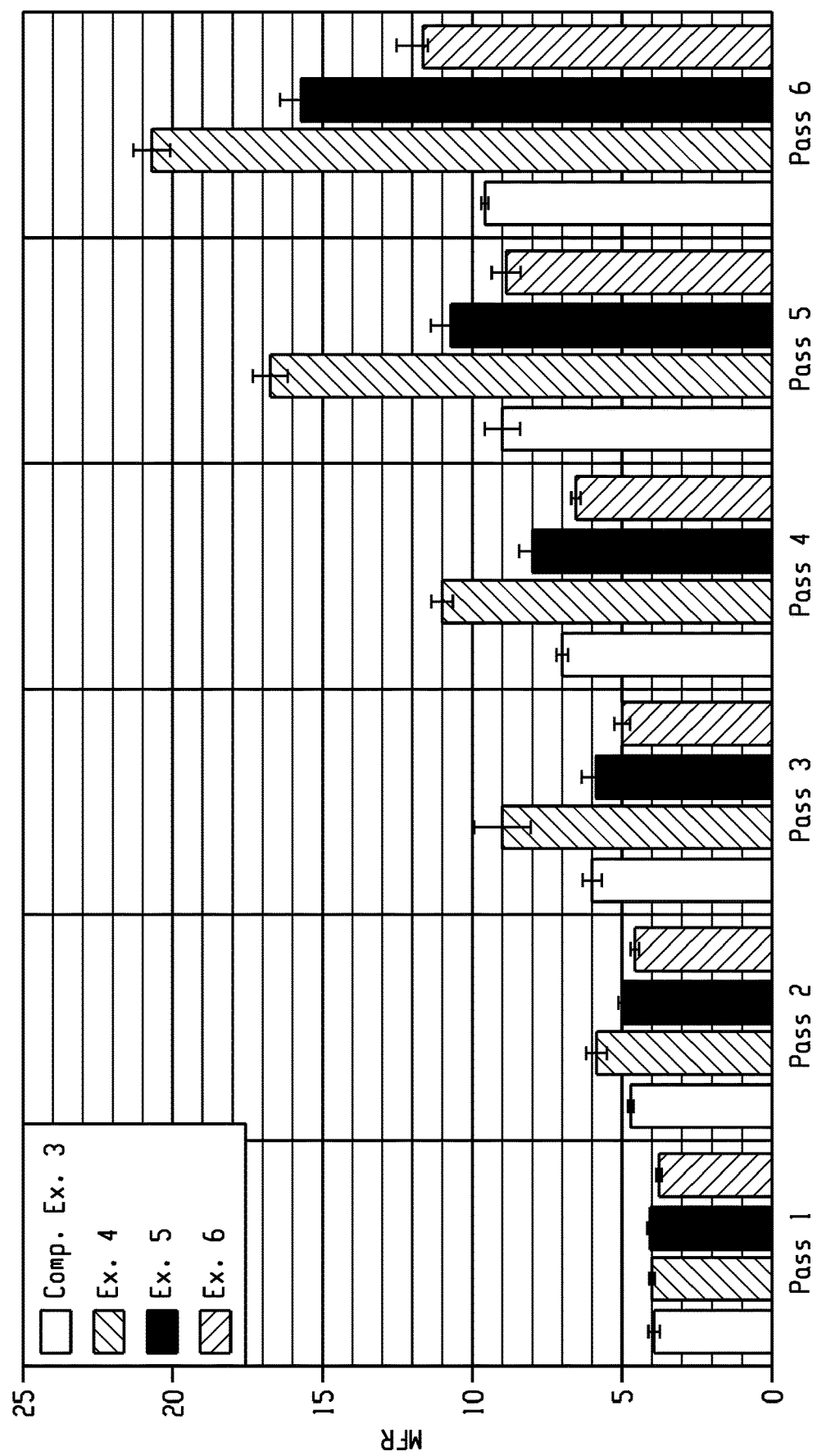

POLYPROPYLENE COMPOSITION FOR USE IN BOPP APPLICATION, A PROCESS FOR PREPARING BOPP FILMS AND SAID BOPP FILM

CROSS REFERENCE TO RELATED APPLICATIONS

This application is a 371 of International Application No. PCT/EP2018/060715, filed Apr. 26, 2018 which is incorporated by reference in its entirety, and which claims priority to European Application Ser. No. 17168748.6, filed Apr. 28, 2017.

TECHNICAL FIELD

The present invention relates to the polypropylene compositions for use in BOPP applications. More specifically, the invention relates to a composition comprising a propylene homopolymer or propylene-ethylene copolymer, a first additive, being a tocopherol or tocotrienol and a second additive, being an organic acid scavenger. Moreover, the invention relates to a biaxially oriented polypropylene (BOPP) film; to a process for the preparation of a biaxially oriented polypropylene (BOPP) film and to the use of the composition according to the invention for the preparation of an article, preferably a BOPP film.

BACKGROUND

For many applications, biaxially oriented polymer films are required. Biaxially oriented polymer films are usually prepared from reheating an unoriented polymer film to a temperature at which the crystals are partially melted and subsequently stretching it into the desired shape. The stretched film is cooled, which reforms the crystals and thereby locking the orientation into place. The properties of biaxially oriented polymer film are highly dependent on the orientation of the polymer chains.

For many biaxially oriented polymer film applications, polypropylene is the material of choice. The polypropylene chosen for such process has to meet the properties required in the end product (the biaxially oriented polypropylene film) as well as the properties required for manufacturing the film and during the stretching process. BOPP films are also known as oriented polypropylene films, and are used in a wide variety of applications, such as packaging and capacitor films.

BOPP films may be produced through a simultaneous or sequential biaxial stretching process, in which films are cold drawn in two consecutive steps at two different temperatures. However, a commercial one step biaxial stretching technique also exists, which allows the production of uniform and highly oriented films at high speed while minimizing energy and production line breaks occurring during deformation. The trend towards using the faster production lines makes it necessary to develop new polymeric compositions that resist the stress encountered during processing without loss of mechanical and optical properties. Depending on the end-use, polypropylene intended for the production of BOPP films, the so-called BOPP grades, therefore has to meet some important challenges.

CN101597401 discloses a BOPP grade having high permeability, high rigidity (stiffness), excellent transparency and gloss for cigarette packaging film without affecting the processing performance is obtained by including a nucleating agent consisting of 2,2-methylene-bis (4,6-di-t-butyl phenoxy) phosphate.

For BOPP grades, a good processability is important as well as good aesthetic performance, especially for the many packaging applications. There is also an increasing demand (and more strict regulation) for increasingly pure BOPP grades comprising less additives or more bio-inspired additives. For the purpose of the invention, with bio-inspired is meant synthetically produced mimicking a natural source or obtained from a natural source.

SUMMARY

The object of the present invention is to provide a novel composition for use in BOPP applications that comprises less additives and/or more bio-inspired (or bio-similar) additives and that has a good processability and good aesthetic performance. More specifically, it is an object to provide a composition for use in BOPP application that does not comprise a phosphorus-containing component. It is a further objection to provide a composition that allows the formation of BOPP films that have good aesthetic performance in view of yellowing.

One or more of these objects are achieved by a first aspect, being a composition comprising:

a) a propylene homopolymer or propylene-ethylene copolymer having an ethylene content of at most 1.5 wt % based on the weight of the propylene-ethylene copolymer, said a propylene homopolymer or propylene-ethylene copolymer having:
  a Mw/Mn in the range of 4.0 to 12, wherein Mw stands for the weight average molecular weight and Mn stands for the number average molecular weight and wherein Mw and Mn are measured according to ASTM D6474-12;
  an XS in the range from 1.0 to 8.0 wt %, wherein XS stands for the amount of xylene solubles which are measured according to ASTM D 5492-10;
  a melt flow rate in the range of 1 to 10 dg/min as measured according to ISO1133:2011 (2.16 kg/230° C.);
b) a first additive, being a tocopherol according to Formula A below:

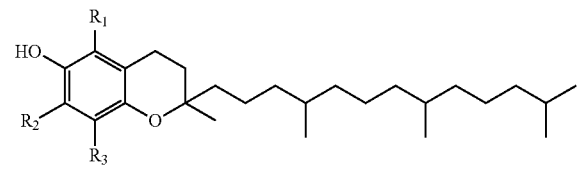

Formula A wherein $R_1$, $R_2$, and $R_3$ are each independently either a hydrogen (H) or a methyl ($CH_3$); or
a tocotrienol according to Formula B below:

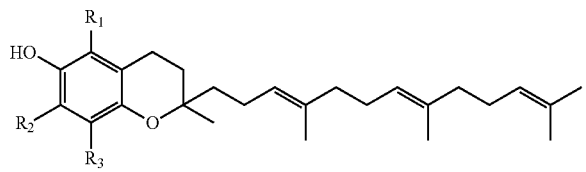

Formula B wherein $R_1$, $R_2$, and $R_3$ are each independently either a hydrogen (H) or a methyl ($CH_3$);

c) a second additive, being an organic acid scavenger.

A second aspect relates to a biaxially oriented polypropylene (BOPP) film comprising the composition according to the first aspect. In an embodiment, the second aspect relates to a biaxially oriented polypropylene (BOPP) film consisting of the composition according to the first aspect.

A third aspect relates to a process for the preparation of a biaxially oriented polypropylene (BOPP) film according to the second aspect, said process comprising the steps of: (a) providing the composition according to the first aspect; (b) extruding the composition provided in step a) into a sheet; and (c) stretching the sheet of step b) in a machine direction (MD) and a transverse direction (TD) to obtain a biaxially oriented polypropylene film.

A fourth aspect relates to the use of the composition according to the first aspect for the preparation of an article, preferably a BOPP film.

Embodiments of each of these aspects will be discussed below. Embodiments discussed for one aspect, may also be applicable to the other aspects.

DESCRIPTION OF DRAWINGS

FIG. 1 is a graph of the MFR after several passes for several compositions.

DESCRIPTION OF EMBODIMENTS

As discussed above, a first aspect relates to a composition comprising a) propylene homopolymer and/or propylene-ethylene copolymer; b) a first additive, and c) a second additive. Each of which will be discussed in more detail below.

Propylene homopolymer or propylene-ethylene copolymer

Several embodiments for the propylene homopolymer or propylene-ethylene copolymer forming a) of the composition as discussed below.

The propylene homopolymer or propylene-ethylene copolymer has an ethylene content of at most 1.5 wt % based on the weight of the propylene-ethylene copolymer. The ethylene content in the propylene-ethylene copolymer is relatively low, being at most 1.5 wt % based on the propylene-ethylene copolymer. For example the ethylene content is at least 0.1 wt %, for example at least 0.2 wt %, for example at least 0.3 wt %, for example at least 0.4 wt %, for example at least 0.5 wt % and/or for example at most 1.5 wt %, for example at most 1.2 wt % based on the propylene-ethylene copolymer. By using a propylene-ethylene copolymer for the preparation of a BOPP film instead of a propylene homopolymer, processability may be improved. Within the framework of the invention, with propylene-ethylene copolymer is meant a random propylene-ethylene copolymer.

The propylene homopolymer or propylene-ethylene copolymer has a Mw/Mn in the range of 4.0 to 12, wherein Mw stands for the weight average molecular weight and Mn stands for the number average molecular weight and wherein Mw and Mn are measured according to ASTM D6474-12. I, In an embodiment, the propylene homopolymer or propylene-ethylene copolymer has a molecular weight distribution (MWD) of at least 5.0, for example at least 6.0 and/or at most 12, for example at most 9.0, for example the propylene homopolymer or propylene-ethylene copolymer according to the invention has a molecular weight distribution in the range from 6.0 to 9.0. The effect of this is that this will allow the film to have less gauge variation, in other words, to be able to prepare a film having a uniform thickness and/or with an acceptable high speed processing behavior.

In an embodiment, the propylene homopolymer or propylene-ethylene copolymer has a Mw of at least 400 kg/mol. In an embodiment, the propylene homopolymer or propylene-ethylene copolymer has a Mw of at least 450 kg/mol. In an embodiment, the propylene homopolymer or propylene-ethylene copolymer has a Mw of at most 600 kg/mol. The effect of this is that high speed processing behavior is optimal in the preparation of a BOPP film.

The propylene homopolymer or propylene-ethylene copolymer has an XS in the range from 1.0 to 8.0 wt %, wherein XS stands for the amount of xylene solubles which are measured according to ASTM D 5492-10. In an embodiment, said propylene homopolymer or propylene-ethylene copolymer has an XS in the range from 1.0 to 5.0 wt %.

In an embodiment, the propylene homopolymer or propylene-ethylene copolymer has an XS of at most 7 wt. %, preferably at most 6 wt. %, more preferably at most 5.0 wt. %, such as at most 4.5 wt %, preferably at most 4.0 wt %, for example at most 3.5 wt %, for example at most 3.0 wt % and/or preferably at least 1.0 wt %, for example at least 1.5 wt % based on the propylene homopolymer or propylene-ethylene copolymer. The effect of this is to obtain a good high speed processing for the preparation of a BOPP film.

The propylene homopolymer or propylene-ethylene copolymer has a melt flow rate in the range of 1 to 10 dg/min or 2 to 8 dg/min as measured according to ISO1133:2011 (2.16 kg/230° C.). In an embodiment, the propylene homopolymer or propylene-ethylene copolymer has a melt flow rate in the range of 2 to 6 dg/min as measured using to ISO1133:2011 (2.16 kg/230° C.).

In an embodiment, the propylene homopolymer or propylene-ethylene copolymer has an isotacticity of at most 98 wt %, for example at most 97 wt %, for example at most 96 wt %, for example at most 95 wt %, for example at most 94 wt %, for example at most 93 wt %, based on the propylene homopolymer or propylene-ethylene copolymer, wherein the isotacticity is determined using 13C NMR. In an embodiment, the propylene homopolymer or propylene-ethylene copolymer has an isotacticity of at least 90 wt % based on the propylene homopolymer or propylene-ethylene copolymer, wherein the isotacticity is determined using 13C NMR. A lower isotacticity allows for a good stretchability of the BOPP film.

In an embodiment, the propylene homopolymer or propylene-ethylene copolymer are essentially phthalate-free. In the present description "essentially phthalate-free" means the presence of less than 0.0001 wt % of one or more phthalates based on the propylene homopolymer and/or propylene-ethylene copolymer, preferably 0.000001 wt % of phthalates based on the propylene homopolymer and/or propylene-ethylene copolymer.

The person skilled in the art is aware how to prepare a propylene homopolymer or propylene-ethylene copolymer. The preparation of propylene homopolymers and propylene-ethylene copolymers is, for example, described in Moore, E. P. (1996) Polypropylene Handbook. Polymerization, Characterization, Properties, Processing, Applications, Hanser Publishers: New York.

Polypropylene homopolymers and propylene-ethylene copolymers can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

First Additive

The first additive in the composition is either a tocopherol or a tocotrienol or a combination of one or more thereof. The first additive may be a mixture of one or more tocopherols and one or more tocotrienols. Both tocopherol and tocotrienol are constituents of vitamin E obtained from a natural source.

The tocopherol used in the present composition is according to Formula A:

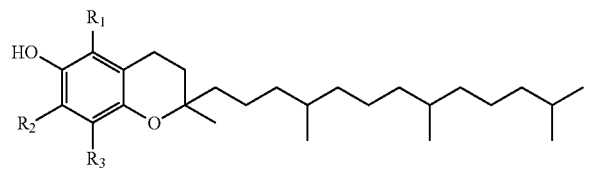

Formula A wherein $R_1$, $R_2$, and $R_3$ are each independently either a hydrogen (H) or a methyl ($CH_3$).

Examples that are suitable as first additives according to the present invention are alpha ($\alpha$)-tocopherol according to Formula A wherein $R_1$, $R_2$, and $R_3$ are each $CH_3$; beta ($\beta$)-tocopherol according to Formula A wherein $R_1$ and $R_3$ are each $CH_3$ and wherein $R_2$ is H; gamma($\gamma$)-tocopherol according to Formula A wherein $R_2$ and $R_3$ are each $CH_3$ and $R_1$ is H; and delta($\delta$)-tocopherol according to Formula A wherein $R_1$ and $R_2$ are each H, and $R_3$ is $CH_3$. These structures are shown below:

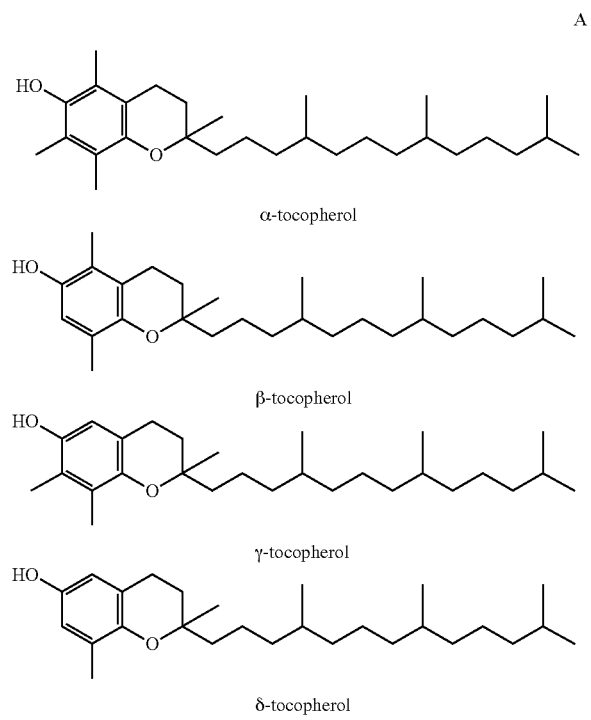

Tocopherol according to Formula A comprises one or more of its stereoisomer forms for all three chiral centers (RRR, SSS, RRS, RSR, SSR, SRS, SRR, RSS). In an embodiment, the stereoisomer shown below is used wherein $R_1$, $R_2$, and $R_3$ are each independently either a hydrogen (H) or a methyl ($CH_3$):

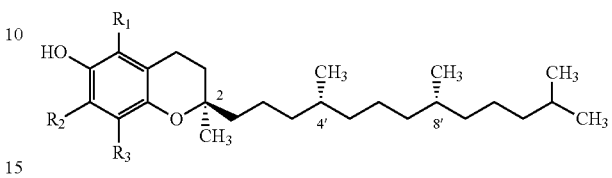

The tocotrienol used in the present composition is according to Formula B:

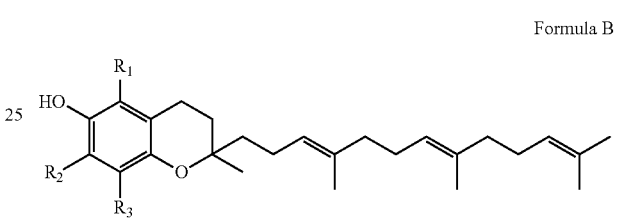

Formula B wherein $R_1$, $R_2$, and $R_3$ are each independently either a hydrogen (H) or a methyl ($CH_3$).

Examples that are suitable as antioxidants according to the present invention are alpha($\alpha$)-tocotrienol according to Formula B wherein $R_1$, $R_2$, and $R_3$ are each $CH_3$; beta($\beta$)-tocotrienol according to Formula B wherein $R_1$ and $R_3$ are each $CH_3$ and wherein $R_2$ is H; gamma($\gamma$)-tocotrienol according to Formula B wherein $R_2$ and $R_3$ are each $CH_3$ and $R_1$ is H; and delta($\delta$)-tocotrienol according to Formula B wherein $R_1$ and $R_2$ are each H, and $R_3$ is $CH_3$. These structures are shown below:

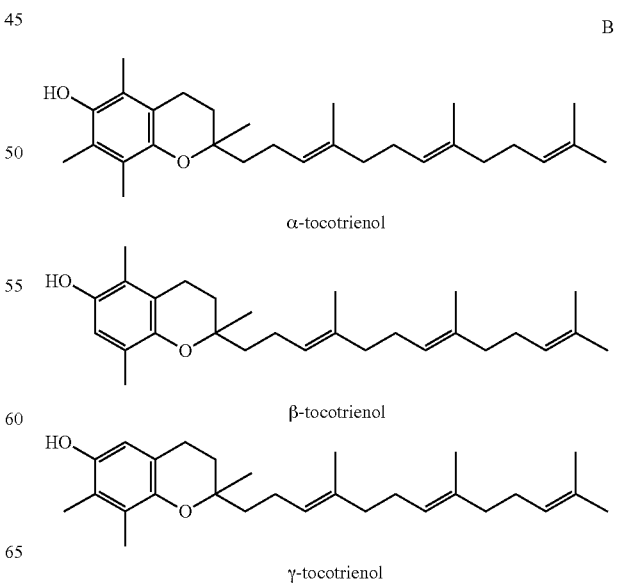

-continued

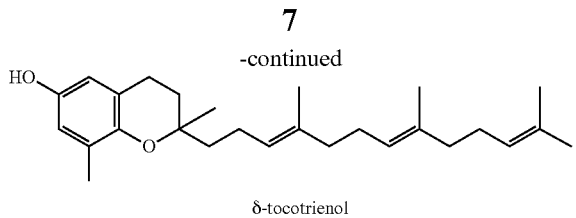

δ-tocotrienol

Tocotrienol according to Formula B comprises one or more of its stereoisomer forms (RS, RR, SS). In an embodiment, the stereoisomer shown below is used wherein $R_1$, $R_2$, and $R_3$ are each independently either a hydrogen (H) or a methyl ($CH_3$):

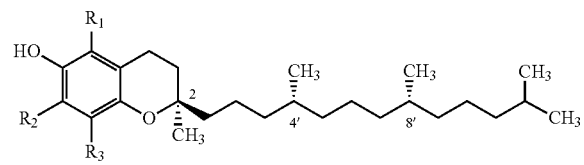

A mixture or combination of one or more of these compounds and their stereoisomers may also be used, such as bio-inspired or vitamin E obtained from a natural source.

In an embodiment, as a first additive D,L-α-tocopherol is used which is a racemic mixture of equal amounts of all eight possible stereoisomers of α-tocopherol (RRR, SSS, RRS, RSR, SSR, SRS, SRR, RSS) and is also referred to as all-rac-alpha-tocopherol. α-tocopherol and/or synthetic α-tocopherol according to the invention may be used, for example in the form of Irganox E 201 (supplied by BASF) which is a D,L-α-tocopherol or all-rac-alpha-tocopherol. The compounds forming this mixture may be synthetically produced.

In an embodiment, the amount of first additive in the composition is between 25 and 2000 ppm. In an embodiment, the amount of first additive in the composition is between 50 and 1000 ppm. In an embodiment, the amount of first additive in the composition is between 50 and 500 ppm. In an embodiment, the amount of first additive in the composition is between 50 and 250 ppm. In an embodiment, the amount of first additive in the composition is between 50 and 100 ppm.

In an embodiment, the tocopherol(s) and/or tocotrienol(s) are used in the form of a masterbatch, viz. a mixture of a polymer and a certain amount of the tocopherol(s) and/or tocotrienol(s), e.g. a masterbatch comprising between 1 and 10 wt % of the tocopherol(s) and/or tocotrienol(s) based on the weight of the masterbatch. The first additive may be added in the form of a masterbatch, for example a masterbatch of LDPE with the first additive. When using such a masterbatch for the first addition, this might lead to an amount of LDPE in the composition (e.g. 2000-5000 ppm), however this is not considered to be part of the total amount of additives.

In an embodiment, the composition does not comprise a phosphorus-containing component, such as a phosphite secondary antioxidant. In an embodiment, the composition comprise a phosphorus-containing component in an amount of no more than 50 ppm, preferably no more than 10 ppm, more preferably no more than 5 ppm.

Second Additive

The second additive in the composition is an organic acid scavenger.

In an embodiment, the acid scavenger is an metal salt of a fatty acid. In an embodiment, said fatty acid is a long chain fatty acid (LCFA) having a aliphatic tail of 13 to 21 carbon atoms, for example an aliphatic tail of 16 or 18 carbon atoms. In an embodiment, said fatty acid is stearate. In an embodiment, said organic acid scavenger is calcium stearate, zinc stearate or magnesium stearate, for example calcium stearate.

In an embodiment, the amount of organic acid scavenger in the composition is between 100 and 5000 ppm. In an embodiment, the amount of organic acid scavenger in the composition is between 200 and 1000 ppm. In an embodiment, the amount of organic acid scavenger in the composition is between 250 and 750 ppm, such as approximately 500 ppm.

Composition

In an embodiment, the total amount of additives in the composition is at most 1000 ppm. With the "total amount of additives" in the composition is meant the combined amount of the first additive (antioxidant), the second additive (acid scavenger) and optionally the one or more additional additives. However, polymer or other carrier components from for example a masterbatch are not considered as an additive but as polymer/carrier components.

In an embodiment of the second aspect, said composition has a CIELAB b-value of at most 5.0, for example at most 4.0.

The BOPP composition may contain one or more additional additives, such as antioxidants. The BOPP composition preferably comprises no other polymer than the propylene homopolymer and/or propylene-ethylene copolymer of the invention (with the exception of any polymer or carriers used in any masterbatches). Thus the remaining part (in addition to the components a), b) and c)) up to 100 wt % may be supplemented by additives known to the person skilled in the art. In other words, the compositions may consist of a) propylene homopolymer and/or propylene-ethylene copolymer; b) a first additive, and c) a second additive and optionally additional additives.

Film

In an embodiment of the second aspect, the BOPP film comprises at least 80 wt %, preferably at least 90 wt %, more preferably at least 95 wt %, even more preferably at least 96 wt %, or 97 wt % or even 98 wt % of the composition according to the invention based on the weight of said film.

A frequently used method for the evaluation of processing stability is so-called multiple-pass extrusion; involving repeatedly passing the composition through an extruder and collecting samples after each pass. In multiple-pass extrusion experiments color measurements are generally used as one of the possible evaluation methods.

In an embodiment of the second aspect, said film has a thickness of between 5 or 10 and 500 micron and having a draw ratio of at least three (3) times in the machine direction and at least 7 times in the transverse direction (3×7) in simultaneous or sequential mode. The biaxially oriented polypropylene (BOPP) film of the invention may have a draw ratio of at least 3.0 times in machine direction (MD) and/or at least 7.0 times in transverse direction (TD). For example, the biaxially oriented polypropylene (BOPP) film may have a draw ratio in the range from 3.0 to 10.0 times in machine direction and/or for example in the range from 7.0 to 12.0 times in transverse direction.

In an embodiment of the second aspect, said film has a thickness of between 5 and 500 micron. The thickness of such BOPP film may be in the range from 5 to 50 μm, for example in the range of 10 to 45 μm, for example in the range from 12 to 18 μm or for example in the range of 8 to 20 μm.

It has been found that BOPP films prepared from said polypropylene have low yellowing. In addition, the polypropylene of the invention may show one or more of the following advantages: good processing, good film appearance, such as high gloss, low haze and/or low gel count; and/or a uniform film thickness (less gauge variation), less extractables, improved gas fading, less migration (determined by applying modelling software) and/or good organoleptics.

The BOPP film may contain one or more additional additives. The BOPP film preferably comprises no other polymer than the propylene homopolymer and/or propylene-ethylene copolymer of the invention (with the exception of any polymer or carriers used in any masterbatches). Thus the remaining part up to 100 wt % may be supplemented by additives known to the person skilled in the art.

Process

A BOPP film as defined herein is a biaxially oriented film, which is a film that has been obtained by subjecting polypropylene to a stretching process in two directions. The BOPP film can be prepared by conventional stretching (drawing) processes and under conditions known to the person skilled in the art. Conditions for a biaxial (consecutive) stretching process are for example described in WO2015091839, hereby incorporated by reference.

Use

The polypropylene homopolymer and/or propylene-ethylene copolymer or the composition of the invention may suitably be used for applications, such as for flexible packaging (film (e.g. BOPP film)), for thermoforming or for thin-wall injection molding.

Examples of BOPP film applications include but are not limited to (snack food) wrappings, for example transparent cups, containers, trays or thin wall packaging; packaging tape, electronic components wrapping, cigarette overwrap, dielectrical films for capacitor or metallisable films etc.

In another aspect, the invention relates to an article comprising the propylene homopolymer and/or the propylene-ethylene copolymer of the invention or the composition of the invention or the biaxially oriented polypropylene (BOPP) film of the invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. The scope of the present invention is defined by the appended claims. One or more of the objects of the invention are achieved by the appended claims.

Methods

The following methods are used in the Examples.

MWD, Mn, Mw

Mw and Mn were all measured according to ASTM D6474-12 (Standard Test Method for Determining Molecular Weight Distribution and Molecular Weight Averages of Polyolefins by High Temperature Gel Permeation Chromatography). Mw stands for the weight average molecular weight and Mn stands for the number average weight.

Cold Xylene Solubles (XS)

XS, wt % is xylene solubles, measured according to ASTM D 5492-10. 1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes places with stirring for 5 min. The closed flask is then kept for 30 min in a thermostatic water bath at 25° C. for 30 min. The so formed solid is filtered on filtering paper. 25 ml of the filtered liquid is poured in a previously weighed aluminum container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

Isotacticity

"APP wt %" or "weight percentage of atactic polypropylene" as used in the present description means: the fraction of polypropylene obtained in a slurry polymerization that is retained in the solvent. APP can be determined by taking 100 ml of the filtrate ("y" in millilitres) obtained during separation from polypropylene powder after slurry polymerization ("x" in grammes). The solvent is dried over a steam bath and then under vacuum at 60° C. That yields APP ("z" in grammes). The total amount of APP ("q" in grammes) is (y/100)*z. The weight percentage of APP is (q/(q+x))*100%. The isotacticity is 100 wt %-APP (in wt %). The isotacticity was measured using 13C NMR.

Melt Flow Rate (MFR)

For purpose of the invention the melt flow rate is the melt flow rate as measured according to ISO1133:2011 (2.16 kg/230° C.).

Extractable Tests

Extractable tests are carried according using following analytical methods: Volatiles were analyzed by TD-GC-MS, which couples thermal desorption (TD), gas chromatography (GC) and mass spectroscopy (MS). Semi-volatiles were analyzed by PTV-GC-MS, which couples programmed temperature vaporization (PTV), GC and MS. Non-volatiles were analyzed by LC-MS, which couples liquid chromatography (LC) and MS.

Preparation of BOPP Films

Extrusion of PP sheets.

A non-stretching sheet, with a thickness and width of 500 μm and 270 mm respectively, was made by an extrusion line ZE25Ax42D with a discharge amount of 16 kg/hr. The extrusion was carried out at 240° C. and the chill-roll temperature was set to 35° C. The take-off speed was 2,6 m/min. No draw ratio was subjected on the MDO unit after extrusion. Approximately 10-15 m sheet was winded of each sample that was produced for further stretching trials.

Stretching Using a Biaxial Stretching Machine.

BOPP films were produced on the biaxial stretching machine KARO IV. The biaxial stretching was performed in the sequential or in the simultaneous stretching mode. The stretching temperature was 160° C. The conditions during the stretching process are summarized below.

Stretching conditions on the KARO IV.

| Sheet Thickness [μm] | Sheet dimensions [μm] | Stretching oven temp [° C.] | Pre-heat time [S] | Speed MD/TD [%/s] | Draw ratio [MD × TD] | Speed profile |
|---|---|---|---|---|---|---|
| 500 | 90 × 90 | 160 | 30 | 400 | 5 × 10 | SEQ |

The final BOPP film was prepared by stretching the extruded 500 μm sheet 5×10 in sequential mode. This stretching was performed at the temperature T=160° C.

Multiple-Pass Extrusion

Multiple-pass extrusion involves repeatedly passing the polymer through an extruder and then collecting the samples after each pass. After the compounding extrusion under nitrogen (first extrusion step), the pellets were re-extruded three times under air with samples being taken after each pass through the extruder. A ZE 25 by Berstorff having a screw design: 36_D-37 is used. As temperature program the following is used: the sample was added at room temperature, then temperature was increased to 190° C., thereafter to 230° C. The screw speed was 223 min$^{-1}$; the throughput: 18 kg/h; the melt temperature (die): +/−255° C.

Color Measurements

Color measurements were done by using a BYK Gardner ColorView 9000, measuring L*, a*, b* values (CIE), using a 45/0 geometry, light source D65 and a 10° viewing angle. The color measurement is done according to CIELAB (ASTM D6290-05) and ASTM E313. The b-values are disclosed in the Examples below.

EXAMPLES

The present invention is further elucidated based on the Examples below which are illustrative only and not considered limiting to the present invention.

Example 1

A first composition according to the present invention was prepared a propylene homopolymer, having a Mw/Mn of 5.0, having an XS of 4.5, having an MFR of 3.0 g/10 min. As a first additive 75 ppm of D,L-α-tocopherol (in the form of a masterbatch also comprising 2425 ppm LDPE) was used and as second additive 500 ppm of calcium stearate (commercially available) (which is an organic acid scavenger) is used providing a total additive concentration of 575 ppm.

Comparative Example 1

A first comparative composition not according to the present invention was a propylene homopolymer, having a Mw/Mn of 5.0, having an XS of 4.5, having an MFR of 3.0 g/10 min. As a first additive 75 ppm of D,L-α-tocopherol (in the form of a master batch also comprising 2425 ppm LDPE) was used and as second additive 200 ppm of a magnesium aluminum hydroxide carbonate (DHT-4A® commercially available from Kisuma Chemicals) (which is an inorganic acid scavenger) is used providing a total additive concentration of 275 ppm.

Example 2

A second composition according to the present invention was prepared a propylene homopolymer, having a Mw/Mn of 5.0, having an XS of 2.0, having a MFR of 3.0 g/10 min. As a first additive 75 ppm of D,L-α-tocopherol (in the form of a masterbatch also comprising 2425 ppm LDPE) was used and as second additive 500 ppm of calcium stearate (which is an organic acid scavenger) is used providing a total additive concentration of 575 ppm.

Comparative Example 2

A second comparative composition not according to the present invention was prepared a propylene homopolymer, having a Mw/Mn of 5.0, having an XS of 2.0, having a MFR of 3.0 g/10 min. As a first additive 75 ppm of D,L-α-tocopherol (in the form of a masterbatch also comprising 2425 ppm LDPE) was used and as second additive 200 ppm of a magnesium aluminum hydroxide carbonate (DHT-4A® commercially available from Kisuma Chemicals) (which is an inorganic acid scavenger) is used providing a total additive concentration of 275 ppm.

A multi-pass extrusion method was carried out using a Berstorff extruder; results for the changes in color (b-values) over the course of several passes (pass 1=compounding; pass 2=first re-extrusion; pass 3=second re-extrusion; pass 4=third re-extrusion) are shown in Table 1.

TABLE 1 b-values of compositions.

| Pass # | Comp. Example 1 | Example 1 | Comp. Example 2 | Example 2 |
|---|---|---|---|---|
| 1 | 5.37 | 0.54 | 4.08 | −0.04 |
| 2 | 5.53 | 1.21 | 4.21 | 1.04 |
| 3 | 5.93 | 1.99 | 4.82 | 1.66 |
| 4 | 6.32 | 1.90 | 5.01 | 2.12 |

This table clearly shows that the b-values for the compositions according to the invention comprising calcium stearate in addition to D,L-α-tocopherol are significantly lower after the first extrusion step (for both propylene homopolymers with different XS content) compared to examples wherein DHT-4A being an inorganic acid scavenger in addition to D,L-α-tocopherol is applied.

Comparative Example 3 and Examples 4-6

Several composition were prepared comprising a propylene homopolymer, having a Mw/Mn of 5.0, having an XS of 2.0, having a MFR of 3.0 g/10 min.

Several additives were added in different combinations as shown in Table 2 below, being:
- a phenol primary antioxidant (pentaerythritol tetrakis(3-(3,5-di-tert-butyl-4-hydroxyphenyl)propionate)), commercially available as Irganox 1010 supplied by BASF;
- a phosphite secondary antioxidant (bis-t-butyl phenyl phosphite), commercially available as Irgafos 168 supplied by BASF;

D,L-α-tocopherol (in the form of a 3% masterbatch (MB) also comprising 75 ppm D,L-α-tocopherol and 2425 ppm LDPE)
calcium stearate as the organic acid scavenger

TABLE 2 composition of (comparative) examples 3-6

| Example | Phenol AO (ppm) | Phosphite AO (ppm) | Tocopherol (ppm) (total MB) | Acid scavenger (ppm) |
|---|---|---|---|---|
| Comp. 3 | 450 | 450 | 0 | 500 |
| 4 | 0 | 0 | 75(2500) | 500 |
| 5 | 0 | 0 | 150(5000) | 500 |
| 6 | 0 | 0 | 200(6667) | 500 |

Rheological measurements were carried out on these compositions. The results are shown in Table 3 and FIG. 1 (MFR) and Table 4 (b value)

Melt Flow Rate (MFR)

Unless explicitly stated otherwise herein, the melt flow rate was measured according to ISO 1133 (2005) (2.16 kg, 230° C.). The unit of MFR is g/10 min. It should be noted that the Melt Flow Index (MFI) and the Melt Flow Rate (MFR) are used interchangeably.

TABLE 3

MFR of (comparative) examples 3-6 after a number of passes

| Ex. # | Pass 1 | Pass 2 | Pass 3 | Pass 4 | Pass 5 | Pass 6 |
|---|---|---|---|---|---|---|
| Comp. 3 | 3.79 | 4.54 | 5.99 | 7.06 | 8.90 | 9.47 |
| 4 | 3.98 | 5.68 | 8.97 | 11.04 | 16.65 | 20.65 |
| 5 | 4.07 | 4.80 | 5.70 | 7.90 | 10.50 | 15.60 |
| 6 | 3.60 | 4.43 | 4.84 | 6.35 | 8.74 | 11.48 |

TABLE 4 color value of (comparative) examples 3-6 after a number of passes

| Ex. # | Pass 1 | Pass 2 | Pass 3 | Pass 4 | Pass 5 | Pass 6 |
|---|---|---|---|---|---|---|
| Comp. 3 | 0.37 | 3.29 | 5.13 | 5.89 | 7.06 | 7.93 |
| 4 | −0.35 | 0.73 | 1.46 | 1.18 | 1.06 | 1.15 |
| 5 | 0.16 | 1.71 | 2.78 | 4.76 | 4.12 | 4.45 |
| 6 | 0.34 | 1.99 | 3.64 | 4.27 | 4.61 | 4.34 |

From these experiments is can be observed that when the phenolic/phosphite antioxidant mix is replaced by tocopherol antioxidant (compar. 3 versus examples 4-6) up to the third pass (for 75 ppm tocopherol), the fourth pass (for 150 ppm tocopherol) and up to the sixth pass (for 200 ppm tocopherol) the MFR is comparable to the comparative composition including a phenolic/phosphite antioxidant an the color value stays much lower than the comparative example. Hence the processing stability is not adversely affected by the use of a tocopherol antioxidant/organic acid scavenger compared to a phenolic/phosphite antioxidant/organic acid scavenger and the color value is improved/yellowing reduced.

The invention claimed is:

1. A composition comprising:
   a) a propylene homopolymeror propylene-ethylene copolymer having an ethylene content of at most 1.5 wt % based on the weight of the propylene-ethylene copolymer, said a propylene homopolymeror propylene-ethylene copolymer having:
      a Mw/Mn in the range of 4.0 to 12, wherein Mw stands for the weight average molecularweight and Mn stands for the number average molecularweight and wherein Mw and Mn are measured according to ASTM D6474-12;
      an XS in the range from 1.0 to 8.0 wt %, wherein XS stands for the amount of xylene solubleswhich are measured according to ASTM D 5492-10;
      a melt flow rate in the range of 1 to 10 dg/min as measured according to ISO1133 determined at 2.16 kg and 230° C.;
   b) a first additive, being one or more tocopherols according to Formula A below:

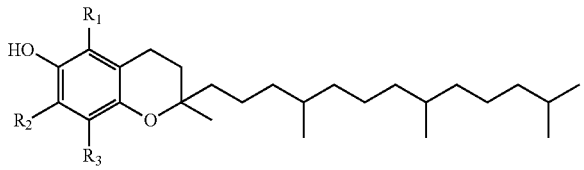

Formula A wherein $R_1$, $R_2$, and $R_3$ are each independently either a hydrogen (H) or a methyl (CH3); and/or
   one or more tocotrienols according to Formula B below:

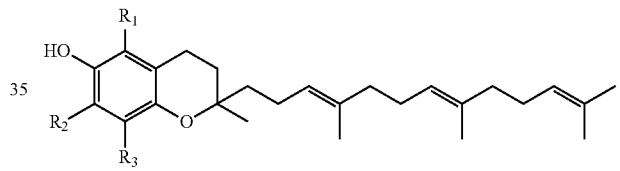

Formula B wherein $R_1$, $R_2$, and $R_3$ are each independently either a hydrogen (H) or a methyl (CH3);
   c) a second additive, being an organic acid scavenger; and wherein the composition comprises a phosphorus-containing component in an amount of less than 10 ppm.

2. Composition accordingto claim 1, wherein said organic acid scavenger is a metal salt of a fatty acid.

3. The composition according to claim 1, wherein the amount of first additive in the composition is between 25 and 2000 ppm.

4. The composition according to claim 1, wherein the amount of organic acid scavengerin the composition is between 100 and 5000 ppm, and/or herein said organic acid scavenger is calcium stearate, zinc stearate or magnesium stearate.

5. The composition according to claim 1, wherein the total amount of additives in the composition is at most 1000 ppm.

6. The composition according to claim 1, wherein said composition comprises no phosphorus-containing compound.

7. The composition according to claim 1, wherein said a propylene homopolymeror propylene-ethylene copolymer having an XS in the range from 1.0 to 5.0 wt %.

8. The composition according to claim 1, wherein as a first additive D,L-α-tocopherol is used.

9. The composition according to claim 1, having a CIELAB b-value of at most 5.0.

10. The composition according to claim 1, wherein the propylene homopolymer or propylene-ethylene copolymer has an isotacticity of at most 98 wt % based on the propylene homopolymer or propylene-ethylene copolymer and/or wherein propylene homopolymer or propylene-ethylene copolymer has an isotacticity of at least 90 wt. % based on the propylene homopolymer or propylene-ethylene copolymer, wherein the isotacticity is determined using 13C NMR.

11. A biaxially oriented polypropylene (BOPP) film comprising the composition according to claim 1.

12. The film according to claim 11, having a thickness of between 5 and 500 micron.

13. The film according to claim 12, having a draw ratio of at least 3 times in the machine direction and at least 7 times in the transverse direction (3×7) in simultaneous or sequential mode.

14. A process for the preparation of a biaxially oriented polypropylene (BOPP) film, comprising the steps of:
(a) providing the composition according claim 1;
(b) extruding the composition provided in step a) into a sheet;
(c) stretching the sheet of step b) in a machine direction (MD) and a transverse direction (TD) to obtain a biaxially oriented polypropylene film.

15. The composition according to claim 2, wherein said fatty acid is a long chain fatty acid (LCFA) having a aliphatic tail of 16 or 18 carbon atoms.

16. The composition according to claim 2, wherein said fatty acid is a long chain fatty acid (LCFA) having a aliphatic tail, wherein the fatty acid is stearate.

17. The composition according to claim 3, wherein the amount of first additive in the composition is between 50 and 100 ppm.

18. The composition according to claim 4, wherein the amount of organic acid scavenger in the composition is between 250 and 750 ppm.

19. The composition according to claim 4, wherein said organic acid scavenger is calcium stearate.

20. The composition according to claim 6, wherein said composition comprises no phosphite secondary antioxidant.

* * * * *